(12) United States Patent
Morgan et al.

(10) Patent No.: US 10,598,851 B2
(45) Date of Patent: Mar. 24, 2020

(54) LIGHT DIFFUSER

(71) Applicant: NANO-LIT TECHNOLOGIES LIMITED, Carnoustie (GB)

(72) Inventors: Sarah Morgan, Carnoustie (GB); Nicholas Mackinnon, Vancouver (CA)

(73) Assignee: NANO-LIT TECHNOLOGIES LIMITED, Carnousite (GB)

( * ) Notice: Subject to any disclaimer, the term of this patent is extended or adjusted under 35 U.S.C. 154(b) by 611 days.

(21) Appl. No.: 14/914,603

(22) PCT Filed: Aug. 20, 2014

(86) PCT No.: PCT/GB2014/052553
§ 371 (c)(1),
(2) Date: Feb. 25, 2016

(87) PCT Pub. No.: WO2015/028781
PCT Pub. Date: Mar. 5, 2015

(65) Prior Publication Data
US 2016/0216443 A1    Jul. 28, 2016

(30) Foreign Application Priority Data

Aug. 27, 2013 (GB) .................... 1315241.8

(51) Int. Cl.
*G02B 6/04* (2006.01)
*F21V 9/30* (2018.01)
(Continued)

(52) U.S. Cl.
CPC .................. *G02B 6/04* (2013.01); *F21S 8/00* (2013.01); *F21V 7/22* (2013.01); *F21V 9/30* (2018.02);
(Continued)

(58) Field of Classification Search
CPC . F21V 23/003; F21V 9/16; F21V 7/22; F21V 9/30; G02B 6/0006; G02B 6/001;
(Continued)

(56) References Cited

U.S. PATENT DOCUMENTS 4,026,634 A    5/1977   Fukushima
5,356,487 A   10/1994   Goldstein et al.
(Continued)

FOREIGN PATENT DOCUMENTS

DE   10 2009 058939 A1   6/2011
DE   10 2010 034774 A1   2/2012
(Continued)

OTHER PUBLICATIONS

European Examination Report, European Application No. 14777742.9, dated Mar. 2, 2017, 8 pages.
(Continued)

*Primary Examiner* — Anabel Ton
(74) *Attorney, Agent, or Firm* — Fenwick & West LLP

(57) ABSTRACT

Apparatus, methods and systems are provided for improving the quality of illumination from a luminaire. The apparatus, methods and systems provide quantum dots, methods and apparatus for stimulating device light emission from quantum dots, sensors, and controllers to adjust quality of illumination from a luminaire.

16 Claims, 15 Drawing Sheets

(51) Int. Cl.
*F21V 7/22* (2018.01)
*F21V 8/00* (2006.01)
*F21S 8/00* (2006.01)
*F21V 23/00* (2015.01)
*F21Y 113/10* (2016.01)
*F21V 23/04* (2006.01)
*F21Y 115/10* (2016.01)
*F21Y 115/30* (2016.01)
*F21Y 113/20* (2016.01)

(52) U.S. Cl.
CPC ............ *F21V 23/003* (2013.01); *G02B 6/001* (2013.01); *G02B 6/0006* (2013.01); *F21V 23/0457* (2013.01); *F21Y 2113/10* (2016.08); *F21Y 2113/20* (2016.08); *F21Y 2115/10* (2016.08); *F21Y 2115/30* (2016.08); *G02B 6/0011* (2013.01); *G02B 6/0051* (2013.01); *G02B 6/0076* (2013.01)

(58) Field of Classification Search
CPC .... G02B 6/004; G02B 6/0011; G02B 6/0051; G02B 6/0075
See application file for complete search history.

(56) References Cited

U.S. PATENT DOCUMENTS

| | | | |
|---|---|---|---|
| 5,812,252 A | 9/1998 | Bowker et al. | |
| 5,937,557 A | 8/1999 | Bowker et al. | |
| 6,152,588 A | 11/2000 | Scifres | |
| 6,491,420 B1 | 12/2002 | Scifres | |
| 6,538,375 B1 | 3/2003 | Duggal et al. | |
| 7,539,882 B2 | 5/2009 | Jessup et al. | |
| 7,703,967 B2 | 4/2010 | Parker | |
| 7,712,932 B2 | 5/2010 | Parker et al. | |
| 7,736,043 B2 | 6/2010 | Parker | |
| 7,780,329 B2 | 8/2010 | McCollum et al. | |
| 7,798,695 B2 | 9/2010 | Parker | |
| 7,810,982 B2 | 10/2010 | Parker et al. | |
| 7,914,196 B2 | 3/2011 | Parker et al. | |
| 7,963,687 B2 | 6/2011 | Parker | |
| 8,005,125 B2 | 8/2011 | Yang | |
| 8,029,708 B2 | 10/2011 | Parker et al. | |
| 8,092,068 B2 | 1/2012 | Parker et al. | |
| 8,104,944 B2 | 1/2012 | McCollum et al. | |
| 8,123,393 B2 | 2/2012 | Parker | |
| 8,127,158 B2 | 2/2012 | Jessup et al. | |
| 8,142,063 B2 | 3/2012 | Parker | |
| 8,215,816 B2 | 7/2012 | Parker | |
| 8,297,818 B2 | 10/2012 | Richardson | |
| 8,308,334 B2 | 11/2012 | Parker | |
| 8,322,905 B2 | 12/2012 | Parker et al. | |
| 8,398,274 B2 | 3/2013 | Parker et al. | |
| 8,405,063 B2 | 3/2013 | Kazlas et al. | |
| 8,423,103 B2 | 4/2013 | Hennessy et al. | |
| 8,459,858 B2 | 6/2013 | McCollum et al. | |
| 8,462,292 B2 | 6/2013 | Parker et al. | |
| 2002/0090182 A1 | 7/2002 | Clarkin | |
| 2005/0279915 A1 | 12/2005 | Elofson | |
| 2006/0271678 A1 | 11/2006 | Jessup et al. | |
| 2007/0045524 A1 | 3/2007 | Rains, Jr. et al. | |
| 2007/0281155 A1 | 12/2007 | Tao et al. | |
| 2008/0032794 A1 | 2/2008 | Ware et al. | |
| 2009/0123360 A1 | 5/2009 | Mills | |
| 2009/0135877 A1 | 5/2009 | Yang | |
| 2009/0142257 A1 | 6/2009 | Mills | |
| 2009/0148729 A1 | 6/2009 | Mills | |
| 2009/0162709 A1 | 6/2009 | Mills | |
| 2010/0247893 A1 | 9/2010 | Zimmerman | |
| 2011/0051414 A1* | 3/2011 | Bailey | F21V 3/00 362/235 |
| 2011/0103757 A1 | 5/2011 | Alkemper et al. | |
| 2011/0194304 A1 | 8/2011 | Han et al. | |
| 2011/0199753 A1 | 8/2011 | Ramer et al. | |
| 2012/0113672 A1 | 5/2012 | Dubrow et al. | |
| 2012/0194068 A1 | 8/2012 | Cheng et al. | |
| 2012/0281428 A1 | 11/2012 | Davis et al. | |
| 2012/0287671 A1 | 11/2012 | Parker et al. | |
| 2013/0016526 A1 | 1/2013 | McCollum et al. | |
| 2013/0017955 A1 | 1/2013 | Hennessy et al. | |
| 2013/0100664 A1 | 4/2013 | Richardson | |
| 2013/0107543 A1 | 5/2013 | Parker et al. | |
| 2014/0035960 A1 | 2/2014 | You et al. | |
| 2014/0036203 A1 | 2/2014 | Guillou et al. | |
| 2014/0036536 A1 | 2/2014 | Gettemy et al. | |
| 2014/0036538 A1 | 2/2014 | You et al. | |
| 2015/0124195 A1* | 5/2015 | Chen | G02F 1/133512 349/61 |
| 2016/0216443 A1* | 7/2016 | Morgan | F21S 8/00 |

FOREIGN PATENT DOCUMENTS

| | | |
|---|---|---|
| DE | 10 2011 017728 A1 | 10/2012 |
| EP | 1555477 A1 | 7/2005 |
| EP | 2383590 A1 | 11/2011 |
| WO | WO 2011/005859 A2 | 1/2011 |

OTHER PUBLICATIONS

European Examination Report, European Application No. 14777742.9, dated Sep. 27, 2017, 7 pages.

PCT International Search Report and Written Opinion, International Application No. PCT/GB2014/052553, dated Dec. 2, 2014, 11 Pages.

European Examination Report, European Application No. 14777742.9, dated Apr. 12, 2018, 8 pages.

* cited by examiner

LIGHT DIFFUSER

The present disclosure relates to a light diffuser, and in particular to apparatus and methods for diffusing light in a luminaire.

BACKGROUND

There have been many advances in artificial lighting since humans first began wanting to see after the sun went down. Torches have been replaced by candles and candles by oil lamps, gas lamps and eventually electric lights. There are many types of illumination, including incandescent lamps, arc lamps, metal vapour lamps, discharge tubes, various types of fluorescent lamps and more recently light emitting diode (LED)-based lamps. While there are many ways to create light, human colour vision evolved using the light from the sun and it is this to which all other lighting systems are compared. An important feature of human vision is the ability to identify many different colours. Colour vision results from a complex interaction between illumination, the properties of the object being viewed, the physiology of the eye, and the processing of visual stimulae by the human brain.

In order to reliably perceive the colour of an object, it is important that the object be illuminated with wavelengths of light that closely mimic the light of the sun. Some artificial light sources such as arc lamps do an excellent job of this, while others such as certain types of fluorescent lamps or LED-based lamps do not. This variability in the quality of colour rendering of illumination has been quantified, in a measure known as the colour rendering index (CRI) of a light source. After brightness of illumination this is one of the most important characteristics of a light source, particularly light sources designed to illuminate commercial facilities such as offices, manufacturing facilities and retail facilities such as stores or shopping malls. Light sources with high quality colour have a colour rendering index approaching 100, the value for natural lighting by the sun.

LED based lamps have become popular due to their energy efficiency and long lifetime, and are increasingly being incorporated in luminaires for office and home use. A luminaire is an enclosure that provides a way of mounting a lamp and can incorporate electrical connectors, power conditioners or converters, light directing elements such as reflectors and light diffusing elements such as the moulded plastic panels often seen in fluorescent lamp luminaires in an office. While LED based luminaires have advantages there are also disadvantages. LED luminaires are more costly to make, but do not require regular replacement of bulbs or fluorescent tubes because they lose much less of their brightness over time. Older type luminaires required frequent lighting element replacement and so changes in colour illumination properties over time were also easily rectified. This is not the case with LED luminaires, since the LEDs are permanently mounted on electronic circuit boards and generally require replacement of the entire luminaire or at least a major component.

Another problem with LED luminaires is that while they may be bright and efficient, the colour rendering index may not be suitable for all types of uses. For example, an industrial building used for light manufacturing, may be subsequently leased by fashion design house requiring higher quality illumination. The lighting may need to be adjusted to provide an improved colour rendering index.

Another problem facing LED luminaires is that they are composed of multiple types of LEDs and over long periods of time the colour properties of the different LEDs may change relative to one another, resulting in changes in colour rendering index. Another issue of luminaire aging is that the life times of the different types of LEDs may vary. For example, over a period of years 3% of LEDs of one colour in the luminaire might fail, while 6% of LEDs of another colour in the luminaire might fail, producing a gradual change in colour properties.

Another issue of LED luminaires results from slight variations between luminaires when newer luminaires or luminaires from other manufacturers are added, to an office for example to increase brightness or replace failed or damaged systems, but then do not quite match in colour. This can produce an undesirable aesthetic effect due to perception of the luminaire colour mismatch.

It is an object of the present disclosure to provide an active diffuser that may be incorporated in a luminaire, added to a luminaire, or that can replace an existing diffuser of a luminaire, to controllably improve the colour rendering characteristics of the illumination light, compensate for effects due uneven aging of LEDs and that can correct for appearance mismatch between luminaires.

SUMMARY

According to a first aspect of the disclosure there is provided a luminaire comprising a lamp and an active diffuser arranged to diffuse light from the lamp and comprising a second light source.

A diffuser is a component often added to a light source or luminaire in order to even out the spatial distribution of the light illuminating an area, scene or object. As well as spatially homogenizing the intensity of the light they may be used to spatially homogenize the wavelength of the light. Diffusers may scatter light, reflect light or refract light or be implemented using combinations of these techniques. Common examples of diffusers are the faceted clear panels placed in front of fluorescent tube ceiling panels, or the frosted glass domes mounted in residential ceiling lamps over incandescent or compact fluorescent light bulbs.

Optionally, the lamp is for emitting light having a first output spectrum, and the second light source is for emitting light having a second, different, output spectrum.

Optionally, the second light source comprises quantum dots and one or more energy sources arranged to stimulate the quantum dots to emit light.

A quantum dot is a nanocrystal made of semiconductor materials such as lead sulfide, lead selenide, cadmium selenide, cadmium sulfide and other materials. They can contain as few as 100 atoms or as many as 100,000. These atoms are typically arranged in a three dimensional shell like structure and can range between 2 nm and 10 nm in diameter. This shell forms a three dimensional confinement region limiting the allowable energy states of excited electrons. This in turn limits the amount of energy in the form of photons that can be generated when the electron collapses to the ground state. By controlling the size of the shell the energy and hence wavelength of emitted photons can be tuned. Different sizes of quantum dots can be mixed to create multiple wavelengths of emission from the same excitation source. Quantum dots can be suspended in solution, embedded in substrates, and mixed into coatings that can be painted or evaporated onto surfaces. Quantum dots are commercially available from a number of sources.

Quantum dots can be excited to emit photons using both optical energy and in some configurations by electrical energy. The intensity of light emitted from a quantum dot is proportional to the number of quantum dots available to be excited and the amount of excitation energy applied.

Optionally, the energy sources comprise ultraviolet, violet or blue light sources.

Optionally, the energy sources comprise circuitry for applying electrical fields to the quantum dots.

Optionally, the second light source comprises a sheet of optically transparent or translucent material and the quantum dots are distributed within the sheet.

Optionally, the material comprises a polymer or acrylic material.

A suitable example of a polymer is Lexan.

Optionally, a substantially optically clear and electrically conductive coating is applied to upper and lower surfaces of the sheet and connected to a source of energy to create an electrical field which can controllably stimulate the quantum dots to emit light.

Optionally, leaky optical fibres are embedded in the sheet or disposed along its surface.

Optionally, the leaky optical fibres are arranged orthogonally and may form a grid.

Optionally, the leaky optical fibres are arranged in parallel lines.

Optionally, the leaky optical fibres are arranged as a woven mat structure.

Optionally, the ends of the individual optical fibres are collected at the edge of the sheet into a fibre bundle.

The fibre bundle is typically circular in cross section, but it may be of other cross sectional shape such a square or rectangular.

Optionally, the fibre bundle is connected to a light source that directs light into the optical fibres of the fibre bundle.

The light source may comprise a blue or violet LED or other light source such as a laser.

Optionally, an optical coupler is provided which connects the light source to the fibre bundle.

The optical coupler may comprise a light guide of any suitable cross-sectional shape, such as circular, hexagonal or square, or a liquid light guide.

The quantum dots may be disposed within the optical coupler in liquid in case of a liquid light guide or during moulding in the case of a moulded or cast light guide.

Optionally, the second light source comprises a sheet of optically transparent or translucent material, leaky optical fibres embedded in the sheet or disposed along its surface, and a coating on the leaky optical fibres, wherein quantum dots are distributed within or form the coating.

Optionally, the second light source comprises a sheet of optically transparent or translucent material, leaky optical fibres embedded in the sheet or disposed along its surface, and quantum dots disposed between the energy source and an optical entrance to the fibre optic bundle.

It is also possible for quantum dots to be both distributed within sheets and in addition being provided as a coating on leaky optical fibres embedded in the sheet or disposed along its surface, and/or being disposed between the energy source and the optical entrance to the fibre bundle. The sheets that are provided with leaky optical fibres may also share the same characteristics as the sheets that have quantum dots distributed within them, as mentioned above.

Optionally, the quantum dots are coated on an entrance to the optical fibres.

Optionally, the quantum dots are coated on a surface of a light source.

Optionally, the second light source comprises one or more of the sheets described above.

Optionally, a plurality of sheets are provided, each comprising quantum dots for emitting a different colour.

Optionally, the transparent layers are coated with an optical coating that transmits or reflects certain wavelengths.

Optionally, the coating is a dichroic coating that transmits the wavelengths of light emitted by the quantum dots but reflects the wavelengths of light being used to excite the quantum dots.

Optionally, an antireflective coatings may also be applied to the layers to improve the transmission of light though any of the layers.

Optionally, the transparent layers are bonded.

They may alternatively be stacked with no bonding in the active diffuser.

Optionally, the luminaire comprises a control system which selectively chooses which quantum dots are stimulated to emit light.

Optionally, the luminaire comprises a sensor for detecting light emitted from the lamp and to determine its relative wavelength composition and intensity.

Optionally, the luminaire comprises a sensor for detecting light emitted from the luminaire and to determine its relative wavelength composition and intensity.

Optionally, the sensor is disposed on a surface of the diffuser or within the diffuser.

Optionally, the sensor is remote from the luminaire.

Optionally, the sensor detects light reflected from a region being illuminated.

Optionally, the control system adjusts the light emitted by the second light source in response to data from the sensors.

Optionally, the light emitted by the second light source is adjusted to ensure that light emitted from the luminaire is consistent or constant over time, and/or to correct for lamp ageing effects.

Optionally, the light emitted by the second light source is adjusted for aesthetic reasons or to accommodate human responses to light.

The colour of light affects melatonin production and can affect the natural circadian rhythms of the human body. So making adjustments of this type can help maintain healthy sleeping patterns. The second light source may also be adjusted to induce relaxation or to prevent onset of drowsiness or for other similar purposes.

According to a second aspect of the disclosure there is provided an active diffuser for a luminaire, said diffuser comprising a light source.

Optionally, the light source comprises quantum dots and one or more energy sources arranged to stimulate the quantum dots to emit light.

Optionally, the light source forms the secondary light source of the first aspect and the features of the first aspect are provided by the active diffuser. This includes the control system, which may be provided as part of an active diffuser assembly. The control system may be provided as a stand-alone system for controlling the light source of the active diffuser, or it may be integrated within and form part of a control system for the luminaire.

DETAILED DESCRIPTION

Figure 1:
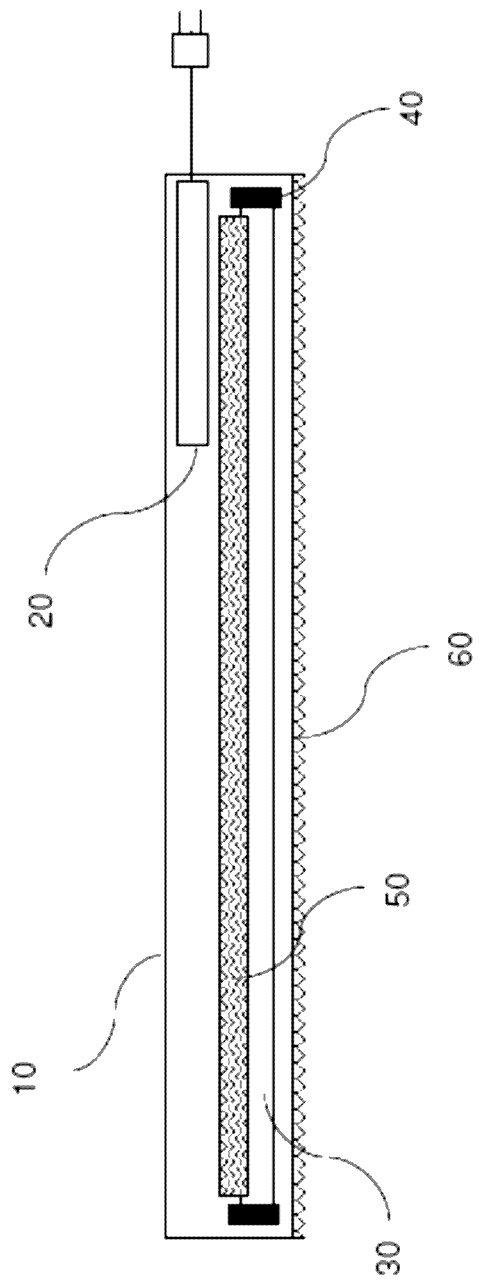
FIG. 1 shows a prior art example of a diffuser used with a fluorescent lamp luminaire.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

The disclosure relates to the improving the quality of light emitted from a luminaire, such as luminaire employing light emitting diodes (LEDs). Turning to FIGS. 1*a-d*, describing prior art, luminaires are fixtures that provide a method of producing and directing light. They typically comprise an enclosure 10, provision for connection to a power source 20, a lamp 30 such as an arc lamp, incandescent bulb, fluorescent tube, or LED, a fixture for mounting or holding the lamp 40, a reflector 50 and diffuser 60. The reflector 50 ensures light is directed toward a surface or region to be illuminated and the diffuser 60 spatially adjusts and randomizes the propagation of light so that illumination is made more even. Both reflectors and diffusers can be used for this randomization and are often employed in concert. For example the reflector 50 may be flat, curved, embossed or faceted to direct light. This directed light may then be further adjusted by passing through a diffuser optimized to work with the reflector to further direct the light. The diffuser may flat, curved, embossed or faceted to direct light. In some cases diffusers are frosted by acid etching or sand blasting, to create a rough surface that will scatter light. In other examples transparent diffusers may incorporate light scattering particles such as titanium dioxide or materials of a different refractive index such as glass beads or microspheres or air bubbles. What all of these diffusers have in common is that they are passive. They scatter and direct the light impinging on them but they do not contribute additional light.

The present disclosure provides an active diffuser which in addition to conditioning the light emitted from a luminaire to provide spatial uniformity, can also inject additional illumination at one or more wavelengths to improve the wavelength characteristics of the light. A diffuser according to the disclosure can be used with any type of lamp but as an example may be provided for luminaires employing LEDs.

Figure 2:
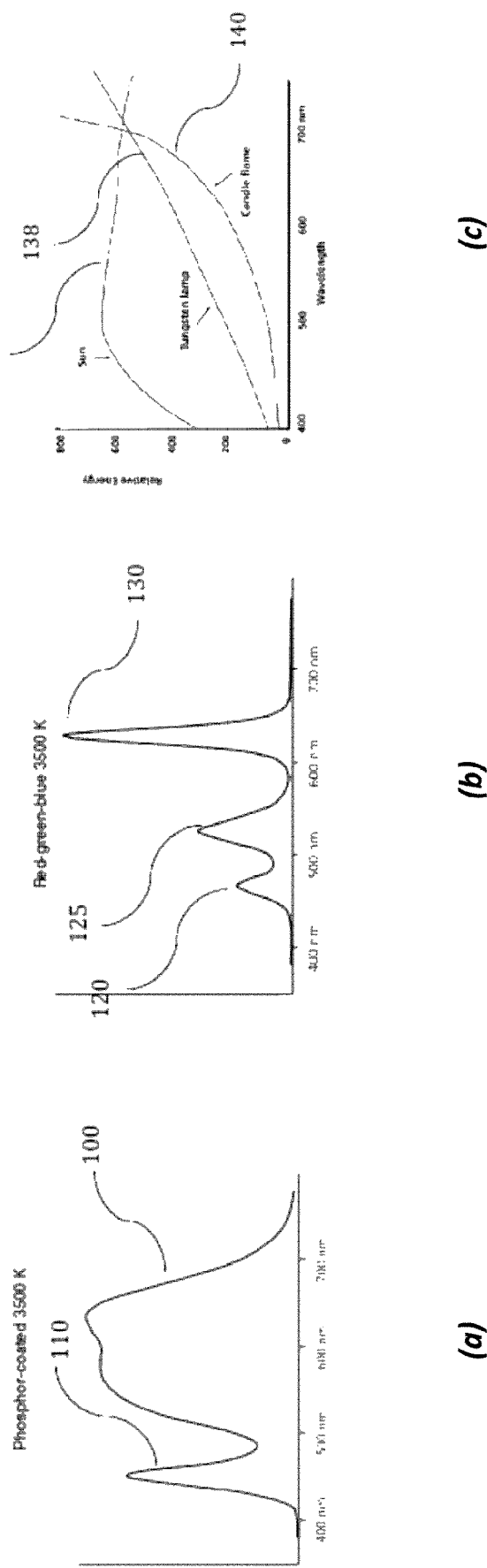
FIG. 2 is a graph showing the wavelength distribution of a LED luminaire.

There are two main types of LED based luminaires. FIGS. 2(*a*) and 2(*b*) show graphs of the output spectra of these types. FIG. 2(*a*) shows the output spectrum of one type of luminaire using a white LED comprising a blue LED coated with a phosphor that fluoresces at green and red wavelengths 100 when excited by the blue light 110 of the LED. This light appears to the eye as white. FIG. 2(*b*) shows the output spectrum of another type of luminaire in which three discrete colour LEDs each with different emission wavelengths are combined in the luminaire. The wavelength of the blue LED 120 is approximately 470 nm, the green LED 125 is approximately 525 nm and the red LED 130 is approximately 620 nm. As can be seen from figures the wavelength intensity distribution of both of these types of illumination has peaks and valleys. In contrast FIG. 2(C) taken from published literature shows that light from the sun 135, light from an incandescent lamp 138, and even candle light 140, have continuous smoothly transitioning wavelength intensity distribution that provides improved colour rendering characteristics.

Objects or scenes being illuminated reflect and absorb many different wavelengths. If these wavelengths are missing from the light illuminating an object or scene then colour characteristics of the object or scene may be misperceived by the viewer. It is a further object of some embodiments of this disclosure to provide conditioning of illumination by filling in and adding missing wavelengths, and/or to provide additional illumination of wavelengths that are already present, to augment light created by the LEDs in a LED based luminaire. Typically the LEDs provide most of the light output of the luminaire with the additional illumination adding a smaller amount of light. In most cases this additional illumination will be less than 5% of the total output but may comprise as much as 20% of the output in some configurations.

Figure 3:
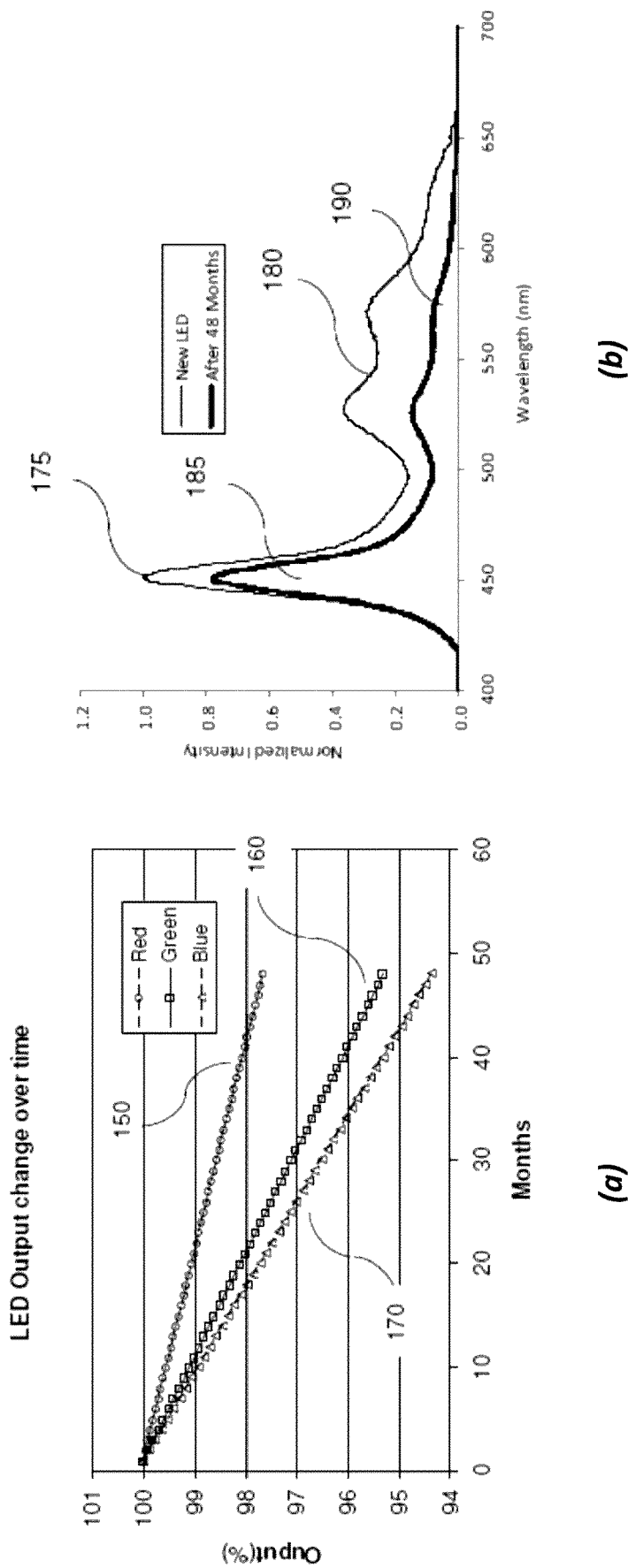
FIG. 3 is a graph showing the change over time in the relative output of a three LED luminaire.

FIG. 3 (*a*) shows a graph of the change in illumination output over time of a three LED luminaire. Red LED 150 maintains more of its initial illumination intensity over time than green LED 160 or blue LED 170. While the brightness of individual LEDs can be adjusted by changing the current driving them, overdriving LEDs can lead to accelerated aging and depending on the architecture of the LED electronics and control systems it may be impossible to apply separate drive currents to the LEDs.

FIG. 3 (*b*) shows a graph of the change in illumination output over time of a white LED comprising a blue LED 175 and a phosphor coating 180. While the blue LED output decreases gradually over time 185, the phosphor coating can age more rapidly 190. The phosphor is typically composed of a variety of rare earth elements and these various components can be affected differently by the heat and humidity of the ambient environment resulting in slight changes in the spectral output of the phosphor. The present disclosure may provide an active diffuser that can selectively and controllably add wavelengths of light to compensate for the differential aging of three LED luminaires, multi LED luminaires and LED plus phosphor luminaires.

Figure 4:
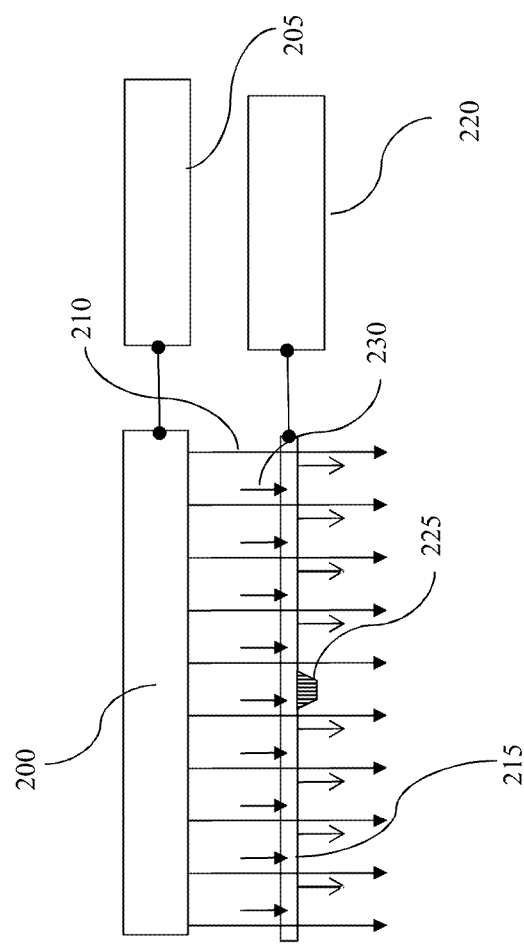
FIG. 4 shows a block diagram of the active diffuser.

FIG. 4 shows a block diagram of a luminaire equipped with an active diffuser. LED light source 200, controlled by luminaire power supply 205 emits LED light 210. Active diffuser 215 is operably connected to and controlled by active diffuser controller 220. The active diffuser controller 220 contains computer implemented programming that responds to input from user commands and sensors including active diffuser sensor 225. The active diffuser sensor 225 senses the wavelength dependent intensity distribution of the combined light output of the luminaire and the active diffuser.

The sensor 225 may comprise a single sensor or a plurality of sensors. It may for example be an image sensor, a colour image sensor, a spectrometer or an optical filter/detector combination. The sensor 225 may be incorporated within or at the active diffuser 215 or in some embodiments of the invention may be located remotely from the active diffuser 215. The sensor 225 may also be located within the luminaire or alternatively may be located remotely from the luminaire. The sensor 225 may communicate by a wired or wireless connection with controller 220. It is possible for the sensor 225 to be part of a cell-phone or smart phone and may include control software in the form of a smartphone application.

Figure 5:
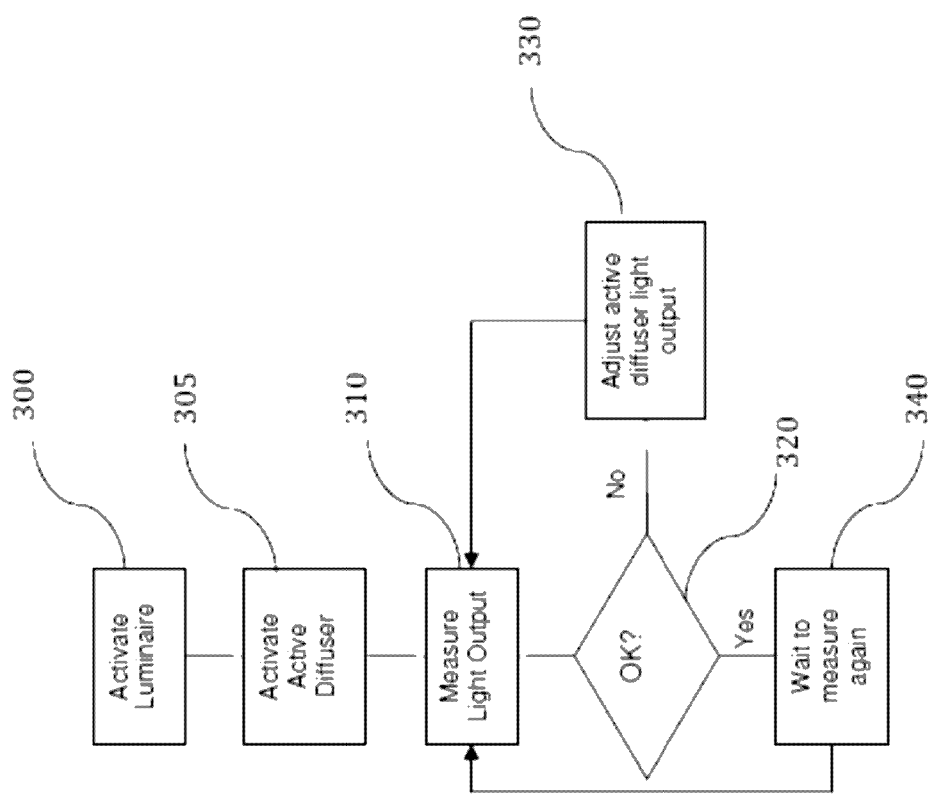
FIG. 5 is a flowchart that describes a preferred method for colour correction the light output of the luminaire.

In response to and under control of signals from the active diffuser controller 220, the active diffuser 215 causes additional light to be emitted to augment the light from the LED luminaire. FIG. 5 shows a method of control of the active diffuser in conjunction with the operation of the LED luminaire. The LED luminaire is activated 300 by a user or automated control system and begins to emit light. The active diffuser is in turn activated 305 and begins to emit light at its most recent setting, or under other settings as determined by the system controller according to its programming. The sensor 225 then measures 310 the light output and communicates it to the active diffuser controller 220 which compares it to a desired value to decide 320 whether adjustment 330 is necessary, or whether to wait to measure again 340.

The light emitted from active diffuser 215 may be produced by quantum dots which have been electrically or optically stimulated. Several preferred embodiments of active diffuser 215 providing different materials and apparatus to deploy and stimulate quantum dots for light emission from the active diffuser 215 are described in more detail below.

Figure 6:
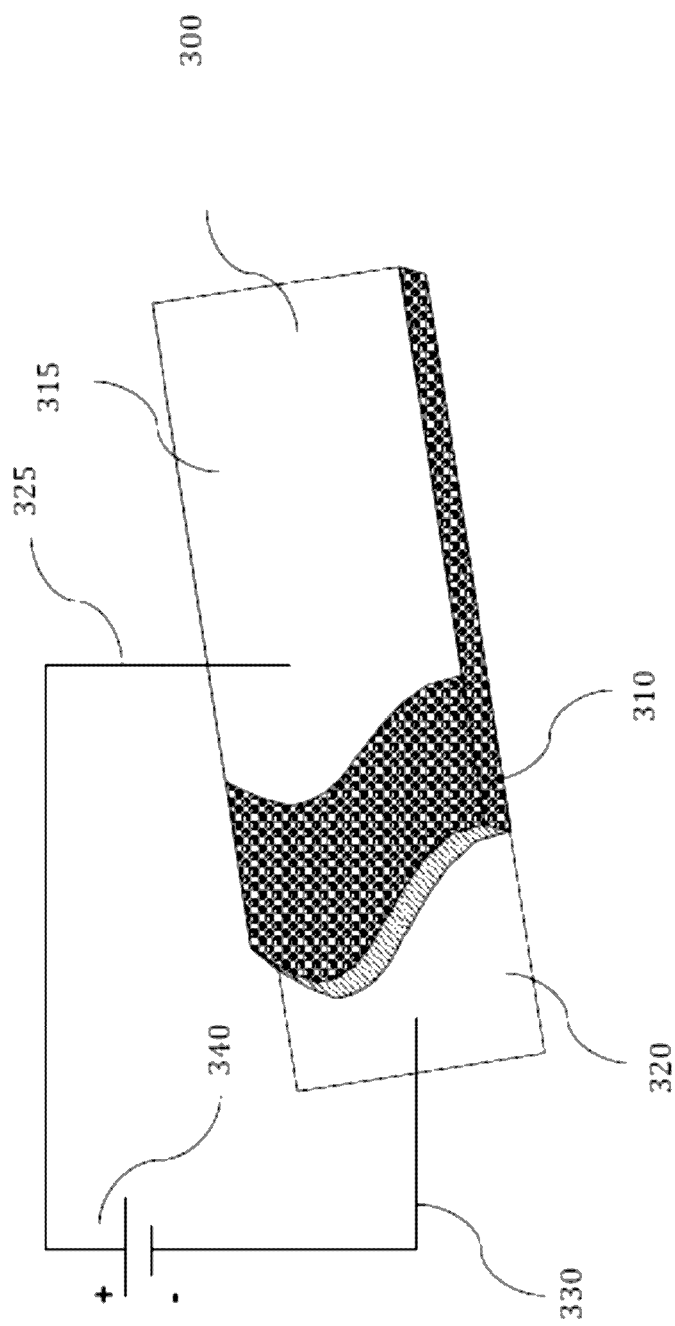
FIG. 6 shows a transparent layer of the active diffuser containing quantum dots and providing electrical stimulation of the quantum dots.

FIG. 6 shows an optically transmissive panel comprising a substrate 310 such as a polymer, glass or semiconductor material that has quantum dots distributed through at least a portion of it, preferably evenly. The substrate may have one size of quantum dot or many sizes of quantum dots distributed through it. Since the colour emitted by a quantum dot is a function of the size of the nanoshell, the distribution of sizes can be used to determine the colour emitted by the active diffuser layer. A clear electrically conductive layer 315, 320 is applied to either side of the substrate and the clear electrically conductive layers are connected to a power supply 340. The positive terminal of power supply 340 is connected to conductive layer 315 and the negative terminal of the power supply is connected to conductive layer 320. The electrical field created can be used to stimulate the emission of the quantum dots. The electrical field may be fixed or variable in voltage, or may comprise an alternating sinusoidal voltage or current or other waveform that provide useful characteristics, such as a square wave or ramp waveform.

Figure 7A:
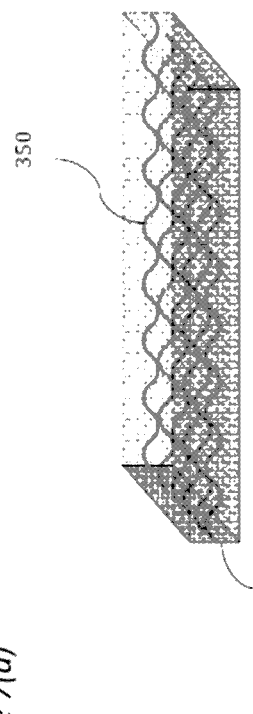
FIG. 7 shows a transparent layer of the active diffuser with fibre optics embedded in and on the surface of the transparent layer.

Turning to FIG. 7(a) we have another example of an optically transmissive substrate 355 comprising a polymer, glass or semiconductor material and containing quantum dots. Here, optical fibres 350 are embedded in the substrate 350.

Figure 7B:
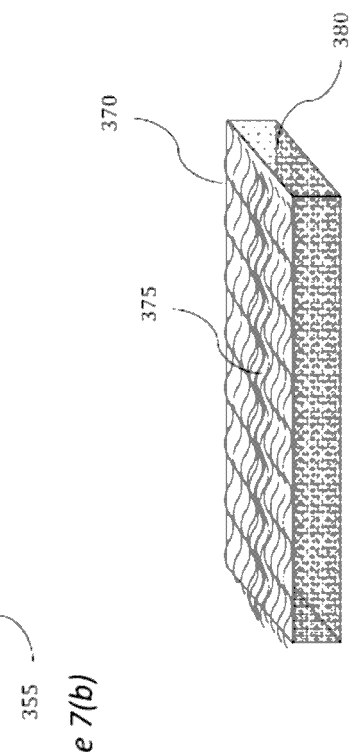

FIG. 7(b) shows an alternative embodiment comprising a transmissive substrate 380 comprising a polymer, glass or semiconductor material and containing quantum dots. Here, optical fibres 375 are disposed on a surface of the transmissive substrate 380.

The optical fibres 350,375 are "leaky" optical fibres that allow a portion of the light directed into them to leak out through the side of the fibre. Such leaky optical fibres are known in the art and are commercially available. The wavelength of light directed into the fibres and leaking out may be selected to stimulate the quantum dots in the transparent substrate. By controlling the amount of light injected into the optical fibres it is possible to control the amount of light emitted by the stimulated quantum dots.

Figure 7C:
Figure 7D:
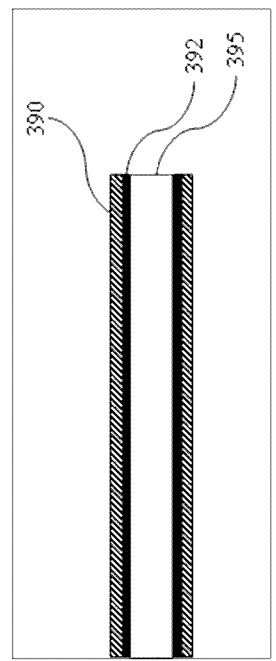

FIG. 7(c) shows a woven mat 385 of leaky optical fibres with no panel substrate. Instead, as shown in FIG. 7(d), a substrate 390 containing quantum dots is coated onto a cladding surface 392 of the leaky optical fibres 395. Different fibres with different size quantum dots in their coatings can be mixed and matched to form different colours of emission from the woven mat 385. The woven mat 385 may be incorporated into a transparent matrix or mounted on the surface of a transparent slab that becomes part of the active diffuser.

Figure 8:
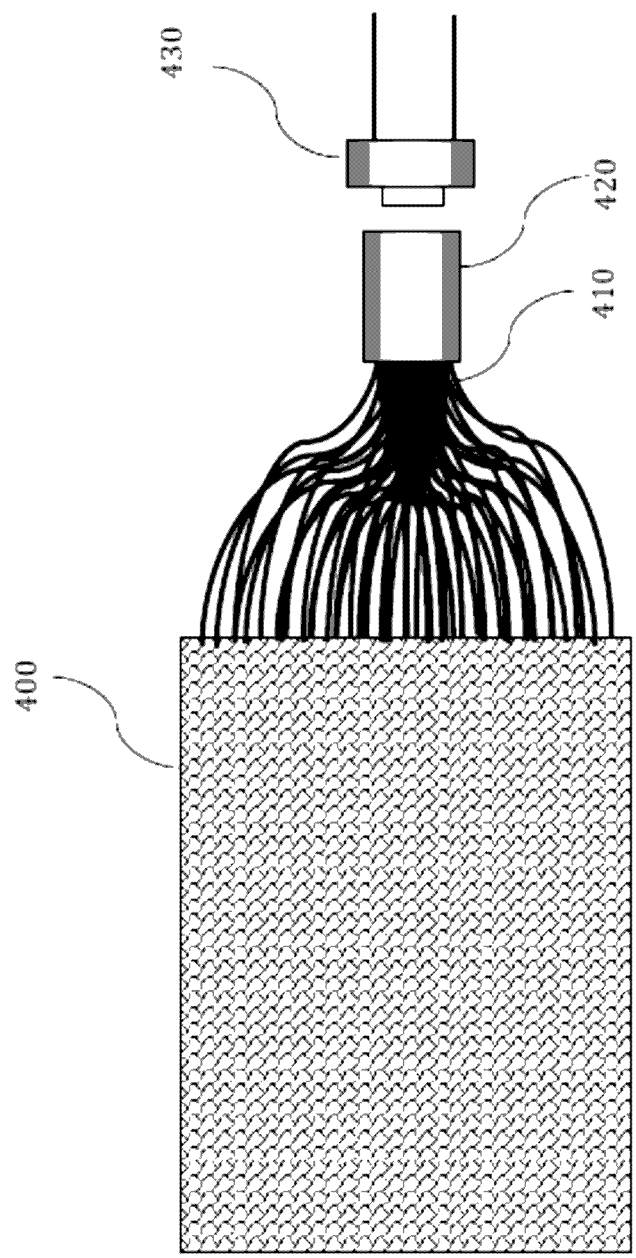
FIG. 8 shows a bundled fibre optic input to a transparent layer of the active diffuser.

FIG. 8 shows an active diffuser slab 400 incorporating leaky fibre optics. The fibre optics may be disposed on the surface of the slab, cast into the matrix of the slab or bonded between slabs. Where the optical fibres 410 exit the slab, they are collected into a bundle which is encapsulated in a connector such as a ferrule 420. The bundled fibres are illuminated by a light source 430. Light source 430 may be any type of light source that can stimulate the quantum dots to emit light, such as an LED, laser diode, or other type of light source.

Figure 9:
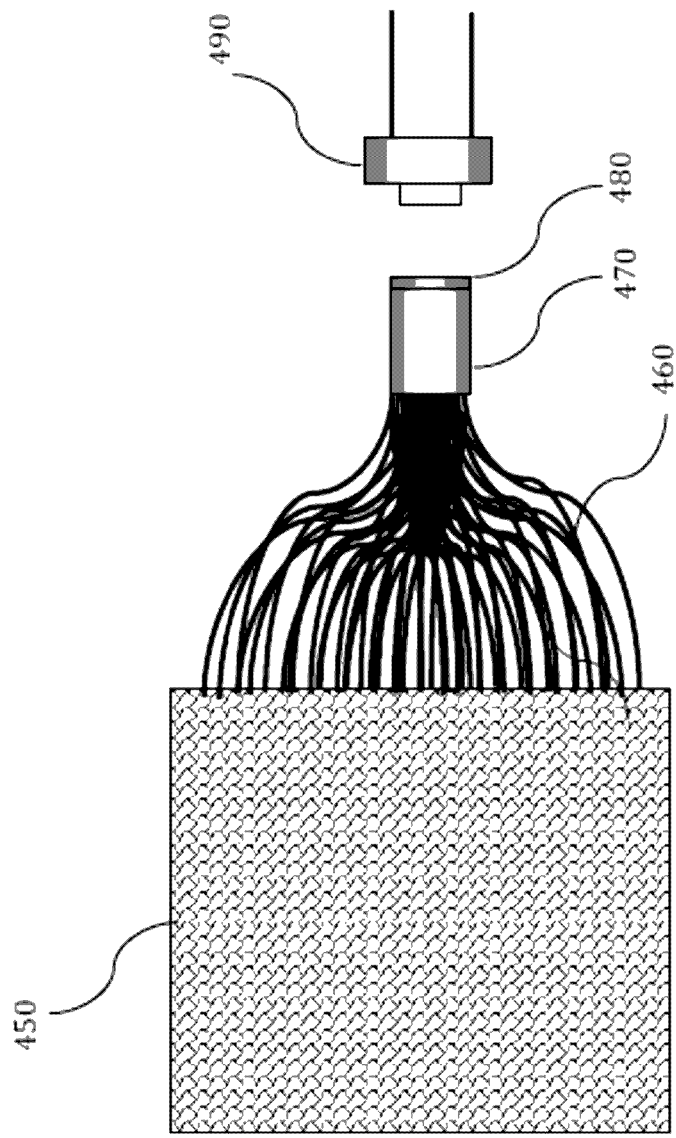
FIG. 9 shows methods the bundled fibre optic connected to the light source with quantum dots disposed on the input surface.

FIG. 9 shows an embodiment of the disclosure where the quantum dots of the active diffuser are not disposed in the slab 450 or on the clad surface of the fibres 460. In this embodiment the quantum dots are coated onto the input port of ferrule 470. Coating 480 containing the quantum dots may be applied to the polished end surface of the leaky optical fibres 460 at the end of ferrule 470, or to a window incorporated in ferrule 470. Light for light source 490 is selected to stimulate the emission of the quantum dots.

Figure 10:
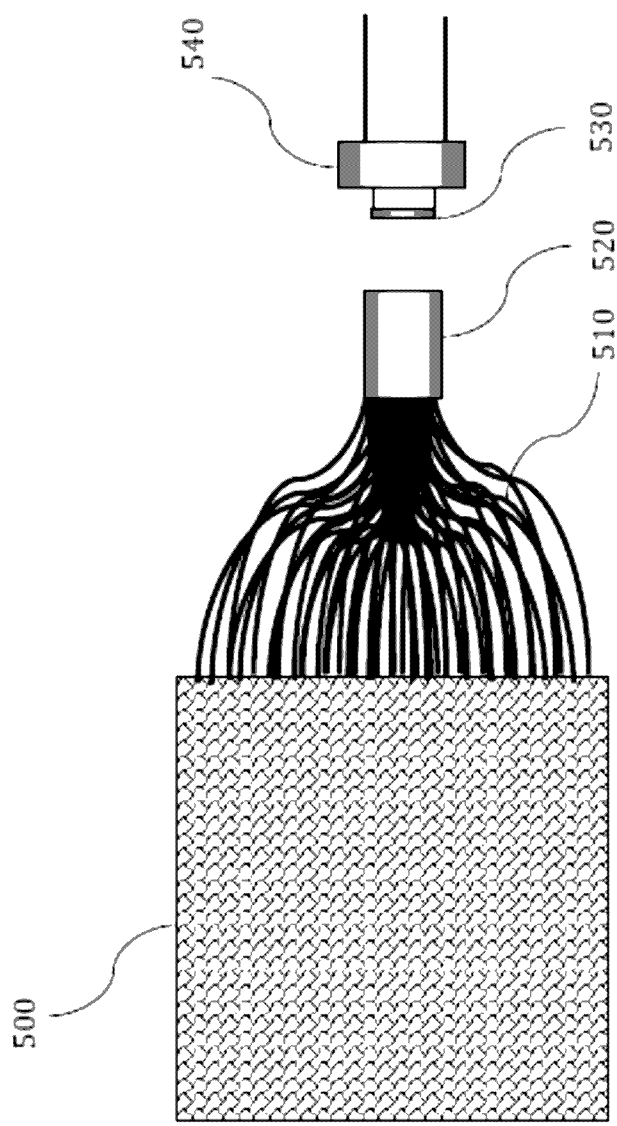
FIG. 10 shows methods the bundled fibre optic to the light source with quantum dots disposed on the LED surface.

FIG. 10 shows another embodiment of the disclosure where the quantum dots of the active diffuser are not disposed in the slab 450 or on the clad surface of the fibres 460 or on the input to the ferrule 470. In this embodiment the quantum dots 530 are coated onto the surface of light source 540 which may be an LED or laser diode, or similar type of light source. Coating 480 containing the quantum dots may be applied to the polished end surface of the LED, or to a window incorporated in light source 540. Light for light source 540 is selected to stimulate the emission of the quantum dots.

Figure 11:
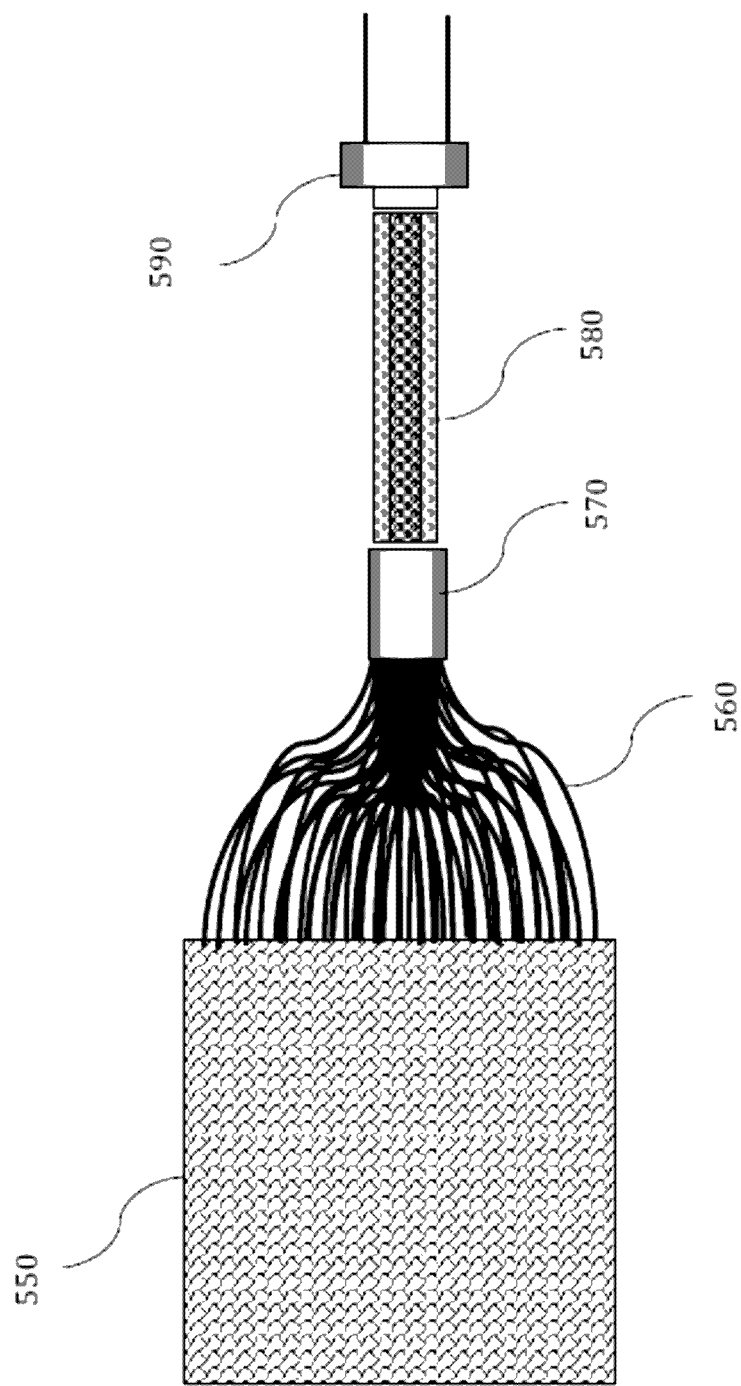
FIG. 11 shows examples of an optical coupler comprising quantum dots.

FIG. 11 shows an example of an optical coupler 580 disposed between the light source 590 and active diffuser fibre optic input ferrule 570. Optical couplers are for coupling light sources and fibre bundles or liquid light guides. They are used to homogenize light input and can be found in scientific instruments, digital projectors, etc. A common form of optical coupler is a rod of glass or other transparent material. Some optical couplers are square or hexagonal in cross section, while some are circular. Some optical couplers rely on total internal reflection and some rely on coated surfaces. FIG. 11 shows an optical coupler that is hexagonal in cross section and is composed of a transmissive substrate with quantum dots mixed into it. In a preferred embodiment the optical coupler has a reflective coating on the surface of the rod, and filters on the end of the rod to select which wavelengths enter or leave the rod. Light source 590 is selected to stimulate the quantum dots in the rod matrix. The filter coating on the input of the rod is selected to transmit the exciting wavelengths of light and reflect the emission of the quantum dots. The filter coating on the distal end of the rod connecting to the fibre optic bundle ferrule 570 is selected to transmit the quantum dot emission but reflect the excitation wavelengths of light source 590.

Figure 12:
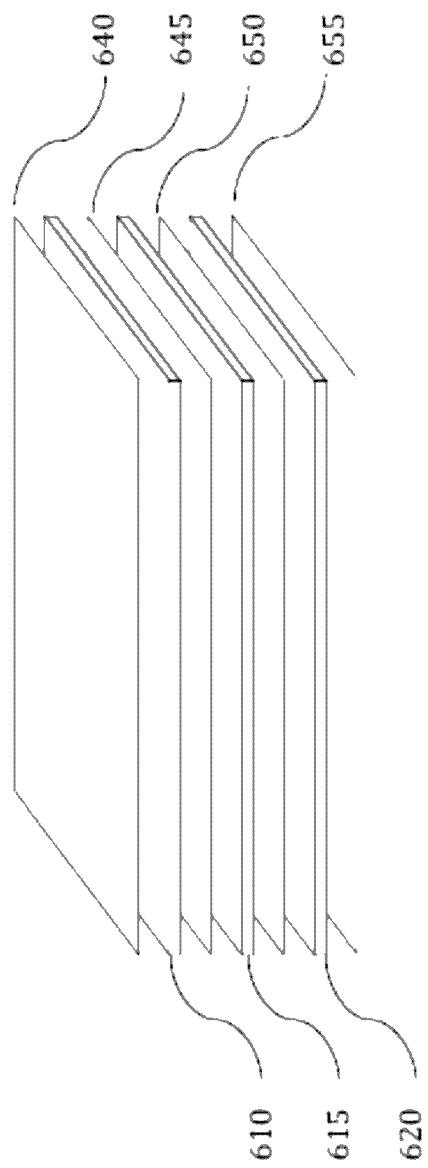
FIG. 12 shows an active diffuser combining multiple transparent layers and dichroic coatings.

Turning to FIG. 12 we show an embodiment of an active diffuser combining multiple layers of the active diffuser slabs described above. When multiple slabs are combined, each slab can be selected to emit a different wavelength or range of wavelengths to augment or correct the emission from the primary luminaire. For example slab 610 might emit green light, slab 615 might emit yellow light and slab 620 might emit red light when the quantum dots of those slabs are stimulated. Since the same wavelength of light can be used to stimulate all the quantum dots, in order to prevent-cross stimulation between layers we can add a dichroic coating that blocks the excitation wavelength but allows the wavelengths emitted by a particular slab and the slab above it to pass through. Dichroic coatings 600, 645, 650, 655 can be selected to optimize transmission and reflection at each layer.

Figure 13:
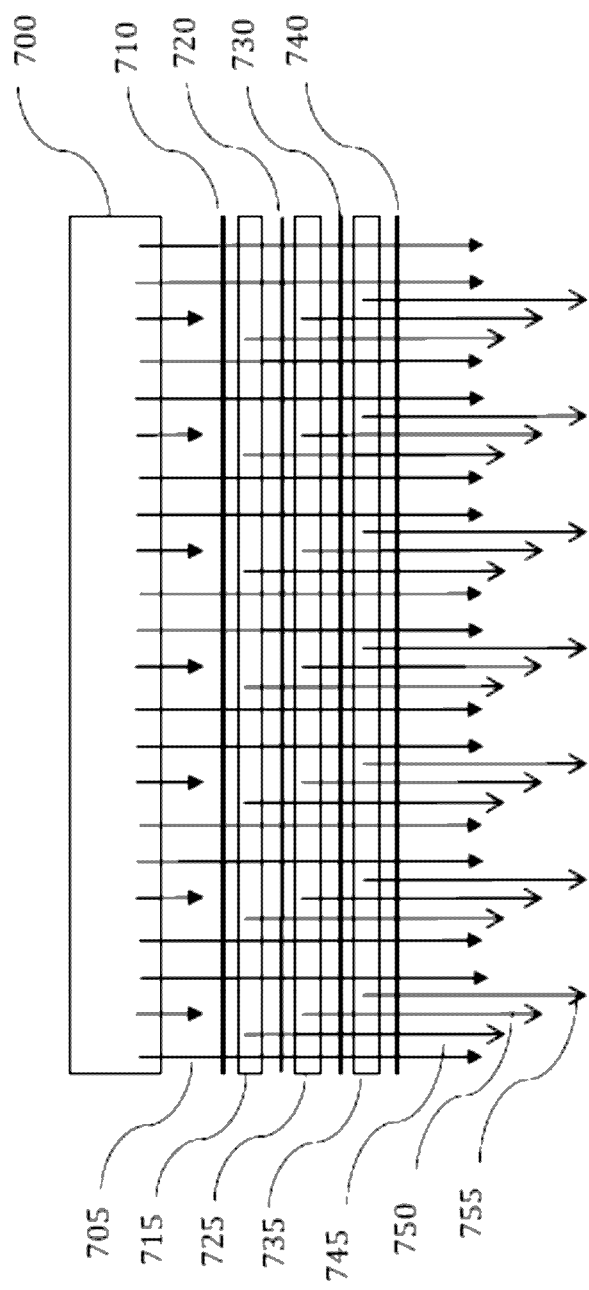
FIG. 13 shows a cross section of an active diffuser combining multiple transparent layers and dichroic coatings and how light enters and is augmented by the active diffuser.

FIG. 13 shows a cross section of an active diffuser combining multiple transparent layers and dichroic coatings and how light enters and is augmented by the active diffuser. Luminaire 700 emits primary LED illumination 705. Primary LED illumination 705 passes through dichroic coating 710 and proximal active diffuser layer 715, then dichroic coating 720 and medial active diffuser layer 725, then dichroic coating 730 and distal active diffuser layer 735 and then final dichroic coating 740. The active diffusers have quantum dots of particular wavelength characteristics disposed within the active layer as previously described. Dichroic coatings 710, 720, 730, and 740, are designed to transmit light at wavelengths produced by the luminaire as well as light at wavelengths emitted by the quantum dots of each of the active diffuser layers. These coatings are designed to reflect light containing the wavelengths that stimulate the quantum dots to emit at their characteristic wavelengths. Since each active diffuser layer is sandwiched between dichroic coatings that reflects the wavelengths of light that stimulate the quantum dots, the amount of light emitted from each layer can be controlled individually by controlling the amount of stimulating light injected into the layer. Light 745 generated in active diffuser layer 715, which could for example be red light, passes through the subsequent dichroic coatings and diffuser layers, and similarly light 750 generated in active diffuser layer 725, which could for example be green light, passes through the subsequent dichroic coatings and diffuser layers, as does light 755 generated in active diffuser layer 735, which could for example be blue light, passes through the final dichroic coating, and in combination with light from each active diffuser layer and the light form the LED luminaire 700, provides the final mix of illumination light which will illuminate a scene or object.

Figure 14:
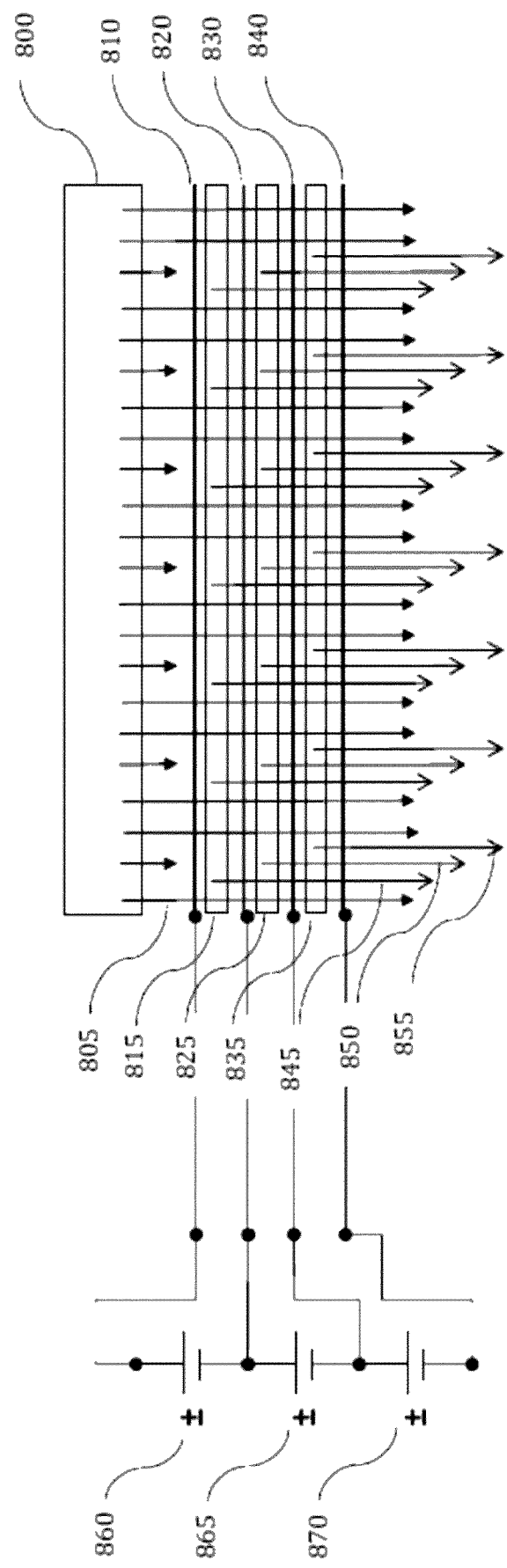
FIG. 14 is a flow chart showing the method of control of the active diffuser.

FIG. 14 shows a cross section of an active diffuser combining multiple transparent layers and electrically conductive coatings and shows how light enters and is augmented by the active diffuser. Luminaire 800 emits primary LED illumination 805. Primary LED illumination 805 passes through electrically conductive coating 810 and proximal active diffuser layer 815, then electrically conductive coating 820 and medial active diffuser layer 825, then electrically conductive coating 830 and distal active diffuser layer 835 and then final electrically conductive coating 840. The active diffusers have quantum dots of particular wavelength characteristics disposed within the active layer as previously described. Electrically conductive coatings 810, 820, 830, and 840, are designed to transmit light at wavelengths produced by the luminaire as well as light at wavelengths emitted by the quantum dots of each of the active diffuser layers. These coatings are designed to be electrically conductive in order to transmit electrical energy to stimulate the optical emission of the quantum dots. Since each active diffuser layer is sandwiched between two electrically conductive coatings the amount of light emitted from each layer can be controlled individually by controlling either the voltage or the current provided by the power supply into the layer. Light 845 generated in active diffuser layer 815, which could for example be red light, passes through the subsequent electrically conductive coatings and diffuser layers, and similarly light 850 generated in active diffuser layer 825, which could for example be green light, passes through the subsequent electrically conductive coatings and diffuser layers, and similarly light 855 generated in active diffuser layer 835, which could for example be blue light, passes through the final electrically conductive coating, and in combination with light from each active diffuser layer and the light from the LED luminaire 800, provides the final mix of illumination light which will illuminate a scene or object. By independently controlling the voltage or current between across conductive layers 810 and 820 by power supply 860, the relative amount of light, for example red light, from the quantum dots in the active layer can be controlled. Similarly power supply 865 can control power between conductive layers 820 and 830, and power supply 870 can control power between conductive layers 830 and 840.

Figure 15:
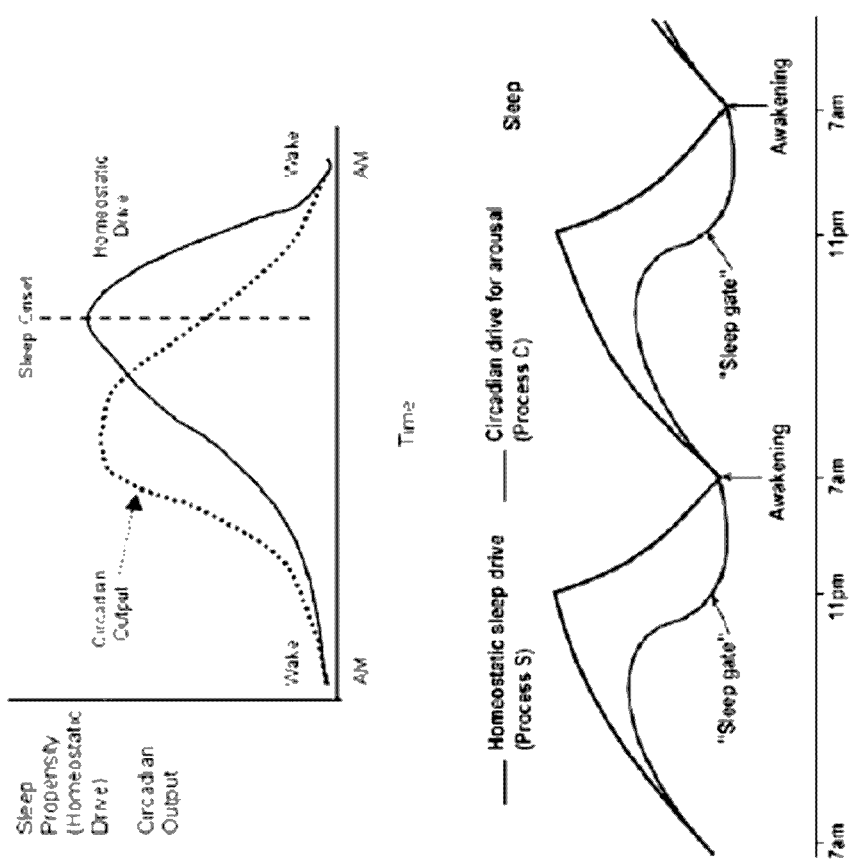
FIG. 15 is a graph showing a method of controlling the active diffuser to mimic natural light that affects circadian rhythms.

FIGS. 15(*a*) and 15(*b*) show graphs of the circadian cycle and the sleep cycle. The circadian cycle is affected by a variety of factors but one of the more significant factors is the quantity and quality of light. Many studies have shown that ambient light affects the production of the hormone melatonin which helps regulate the circadian cycle. By adjusting the amount and the wavelengths of light available it is possible to shift circadian rhythms slightly to promote wakefulness or to induce sleepiness. In one embodiment of this invention, the active diffuser is controlled to adjust over time the relative mix of wavelengths to produce an effect on the circadian rhythms of humans, animals or plants.

Various modifications and improvements can be made to the above without departing from the scope of the disclosure.

The invention claimed is:
1. A luminaire comprising:
a first light source,
a second light source,
an active diffuser arranged to diffuse light from the first light source;
a sensor for detecting light emitted from at least one of the first light source and from the luminaire and to determine detected light data including a relative wavelength composition and intensity; and
a control system for adjusting the light emitted by the second light source in response to the detected light data from the sensor; and
wherein the second light source comprises quantum dots and one or more energy sources arranged to stimulate the quantum dots to emit light.

2. The luminaire of claim 1, wherein the first light source is for emitting light having a first output spectrum, and the second light source is for emitting light having a second, different, output spectrum.

3. The luminaire of claim 1, wherein the second light source comprises a sheet of optically transparent or translucent material, leaky optical fibers embedded in the sheet or disposed along its surface, and quantum dots disposed between the energy source and an optical entrance to the fiber optic bundle.

4. The luminaire of claim 1, wherein the second light source comprises a sheet of optically transparent or translucent material, leaky optical fibers embedded in the sheet or disposed along its surface, and a coating on the leaky optical fibers, wherein quantum dots are distributed within or form the coating.

5. The luminaire of claim 1, wherein the second light source comprises a sheet of optically transparent or translucent material and the quantum dots are distributed within the sheet.

6. The luminaire of claim 5, wherein a substantially optically clear and electrically conductive coating is applied to upper and lower surfaces of the sheet and connected to a source of energy to create an electrical field which can controllably stimulate the quantum dots to emit light.

7. The luminaire of claim 5, wherein leaky optical fibers are embedded in the sheet or disposed along its surface.

8. The luminaire of claim 7, wherein the leaky optical fibers are arranged in one of: orthogonally and may form a grid; or parallel lines; or in a woven mat structure.

9. The luminaire of claim 7, wherein the ends of the individual optical fibers are collected at the edge of the sheet into a fiber bundle; said fiber bundle is connected to a light source that directs light into the optical fibers of the fiber bundle; and wherein an optical coupler is provided which connects the light source to the fiber bundle.

10. The luminaire of claim 5, wherein the second light source comprises one or more of the sheets, which may comprise different sheets comprising quantum dots for emitting different respective colors.

11. The luminaire of claim 10, wherein transparent layers are coated with an optical coating that transmits or reflects certain wavelengths, and wherein the coating is a dichroic coating that transmits the wavelengths of light emitted by the quantum dots but reflects the wavelengths of light being used to excite the quantum dots.

12. The luminaire of claim 11, comprising antireflective coatings applied to the layers to improve the transmission of light though any of the layers.

13. The luminaire of claim 1, wherein the control system selectively chooses which quantum dots are stimulated to emit light.

14. The luminaire of claim 1, wherein the sensor is disposed on a surface of the diffuser or within the diffuser; or is remote from the luminaire.

15. The luminaire of claim 1, wherein the sensor detects light reflected from a region being illuminated.

16. The luminaire of claim 1, wherein the light emitted by the second light source is adjusted to ensure that light emitted from the luminaire is consistent or constant over time, and/or to correct for the first light source ageing effects; or is adjusted for aesthetic reasons or to accommodate human responses to light.

* * * * *

UNITED STATES PATENT AND TRADEMARK OFFICE
CERTIFICATE OF CORRECTION

PATENT NO. : 10,598,851 B2
APPLICATION NO. : 14/914603
DATED : March 24, 2020
INVENTOR(S) : Morgan et al.

Page 1 of 1

It is certified that error appears in the above-identified patent and that said Letters Patent is hereby corrected as shown below:

In the Claims

Column 12, Line 18, after "light" delete "though" and insert --through--.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*